(12) United States Patent
Blasinski (10) Patent No.: US 10,407,049 B2
(45) Date of Patent: Sep. 10, 2019

(54) PREDICTIVELY CONTROLLING THE STATE OF CHARGE OF AN ENERGY STORAGE DEVICE OF AN ELECTRICALLY OPERATED MOTOR VEHICLE

(71) Applicant: AUDI AG, Ingolstadt (DE)

(72) Inventor: Boris Blasinski, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 220 days.

(21) Appl. No.: 15/322,055

(22) PCT Filed: Jun. 15, 2015

(86) PCT No.: PCT/EP2015/001207
§ 371 (c)(1),
(2) Date: Dec. 23, 2016

(87) PCT Pub. No.: WO2015/197166
PCT Pub. Date: Dec. 30, 2015

(65) Prior Publication Data
US 2017/0144648 A1 May 25, 2017

(30) Foreign Application Priority Data
Jun. 25, 2014 (DE) .......................... 10 2014 009 448

(51) Int. Cl.
*B60W 20/11* (2016.01)
*B60L 58/13* (2019.01)
(Continued)

(52) U.S. Cl.
CPC .............. *B60W 20/11* (2016.01); *B60L 58/13* (2019.02); *B60W 10/06* (2013.01); *B60W 10/08* (2013.01);
(Continued)

(58) Field of Classification Search
CPC ...... B60W 20/11; B60W 10/26; B60W 10/30; B60W 20/12; B60W 50/0097;
(Continued)

(56) References Cited

U.S. PATENT DOCUMENTS 8,002,058 B2 * 8/2011 Ishikawa ............... B60W 30/02
180/65.265
8,751,120 B2 * 6/2014 Minase ................. B60W 10/10
701/54
(Continued)

FOREIGN PATENT DOCUMENTS

DE 10 2005 046 340 A1 4/2007
DE 10 2006 002 407 A1 7/2007
(Continued)

OTHER PUBLICATIONS

Machine Translation of DE102012222513A1 (Year: 2012).*

*Primary Examiner* — Freserick M Brushaber
(74) *Attorney, Agent, or Firm* — Seed IP Law Group LLP (57) ABSTRACT

The disclosure relates to a process for route-dependent control of an energy storage device of an at least partially electrically operated motor vehicle, for example a mild-hybrid passenger vehicle, which is implemented by a charge state control device. In this process, said device receives at least one information-containing data value, which relates to a driving situation to be expected on a route section of a driving route. A prediction of the energy requirement of a first device of an onboard network on the route section takes place using the information received. When a predetermined lower threshold value of the predicted energy requirement of the first device is not met, a control signal is generated that causes an energy quantity of an energy reserve of the energy storage device reserved for the first device of the onboard network to be allocated at least partially to a second device of the onboard network. The process may comprise a (Continued)

predicting of a value of a freely available energy reserve of the energy storage device on the route section as a function of the predicted energy requirement and an at least partial allocation of the predicted freely available energy reserve to the second device.

12 Claims, 3 Drawing Sheets

(51) Int. Cl.
| | |
|---|---|
| *B60W 10/26* | (2006.01) |
| *B60W 20/12* | (2016.01) |
| *B60W 10/30* | (2006.01) |
| *B60W 10/08* | (2006.01) |
| *B60W 10/06* | (2006.01) |
| *B60W 50/00* | (2006.01) |

(52) U.S. Cl.
CPC ............ *B60W 10/26* (2013.01); *B60W 10/30* (2013.01); *B60W 20/12* (2016.01); *B60W 50/0097* (2013.01); *B60L 2260/52* (2013.01); *B60L 2260/54* (2013.01); *B60W 2510/244* (2013.01); *B60W 2550/20* (2013.01); *B60W 2550/402* (2013.01); *B60W 2710/244* (2013.01); *Y02T 10/6291* (2013.01); *Y02T 10/705* (2013.01); *Y02T 10/7005* (2013.01); *Y02T 10/7044* (2013.01); *Y10S 903/907* (2013.01)

(58) Field of Classification Search
CPC ................. B60W 10/06; B60W 10/08; B60W 2510/244; B60W 2550/20; B60W 2550/402; B60W 2710/244; B60L 11/1862; B60L 2260/54; B60L 2260/52; Y02T 10/7005; Y02T 10/7044; Y02T 10/705; Y02T 10/6291; Y10S 903/907
See application file for complete search history.

(56) References Cited

U.S. PATENT DOCUMENTS

| | | | | |
|---|---|---|---|---|
| 8,818,603 | B2* | 8/2014 | Kinoshita | ........... B60L 15/2045 701/22 |
| 8,818,674 | B2* | 8/2014 | Nakajima | ............... B60L 7/003 701/72 |
| 8,838,351 | B2* | 9/2014 | Ohbayashi | ............ B60W 50/10 477/111 |
| 9,067,589 | B1* | 6/2015 | Zhao | ..................... B60W 10/06 |
| 9,156,462 | B2* | 10/2015 | Kodama | ............... B60W 10/04 |
| 9,156,466 | B2 | 10/2015 | Huber et al. | |
| 9,242,631 | B2* | 1/2016 | Tanaka | .................. B60W 10/04 |
| 9,302,670 | B2* | 4/2016 | Yamamoto | ............ B60W 20/40 |
| 9,352,739 | B2* | 5/2016 | Gibbs | ...................... B60K 6/46 |
| 2005/0005814 | A1 | 1/2005 | Kumar et al. | |
| 2010/0006358 | A1* | 1/2010 | Ishikawa | ............... B60W 30/02 180/65.265 |
| 2011/0174278 | A1 | 7/2011 | Watanabe et al. | |
| 2011/0202216 | A1 | 8/2011 | Thai-Tang et al. | |
| 2012/0316717 | A1* | 12/2012 | Daum | ................. B60L 11/1861 701/22 |
| 2013/0041545 | A1 | 2/2013 | Bär et al. | |
| 2013/0096749 | A1* | 4/2013 | Hussain | ................... B60K 6/46 701/22 |
| 2013/0311026 | A1* | 11/2013 | Endo | ..................... B60L 3/0046 701/22 |
| 2014/0288742 | A1* | 9/2014 | Hokoi | ................... B60W 20/40 701/22 |
| 2014/0330460 | A1* | 11/2014 | Schoonmaker | ......... B61C 17/12 701/19 |
| 2015/0307109 | A1 | 10/2015 | Graf et al. | |

FOREIGN PATENT DOCUMENTS

| | | |
|---|---|---|
| DE | 10 2008 001 669 A1 | 11/2009 |
| DE | 10 2010 016 188 A1 | 11/2010 |
| DE | 10 2010 029 971 A1 | 12/2011 |
| DE | 10 2011 010 845 B3 | 6/2012 |
| DE | 10 2011 089 085 A1 | 6/2013 |
| DE | 10 2012 222 513 A1 | 6/2014 |

* cited by examiner

PREDICTIVELY CONTROLLING THE STATE OF CHARGE OF AN ENERGY STORAGE DEVICE OF AN ELECTRICALLY OPERATED MOTOR VEHICLE

The invention relates to a process for route-dependent control of an energy storage device of an at least partially electrically operated motor vehicle, wherein a charge state device of the energy storage device controls allocation of an available energy quantity of the energy storage device.

In the course of hybridizing and electrifying motor vehicles, systems with which the motor vehicle can either be completely electrically operated or the storage of electric energy can be accessed even just sometimes are increasingly being developed. For example, onboard electrical systems have been developed for this that can provide a small voltage range of 12 V or even a medium voltage range of 48 V. A so-called mild-hybrid motor vehicle has a 48 V low-voltage system and enables electrical support of the combustion engine and other 48 V chassis devices. Contrary to a full-hybrid vehicle, a mild-hybrid motor vehicle is normally equipped with a relatively small energy storage device. This is sufficient, because the drive is not designed for exclusively electric driving. However, there are other consuming units, so-called chassis devices that require larger quantities of energy. Such type of chassis device comprises, for example, a purely electric turbocharger or a 48 V roll stabilizer. These exemplary chassis devices require a relatively large amount of energy from the small 48 V storage device depending on the driving situation. Thus, the charge state control, for example a battery management system, must always ensure a corresponding amount of energy reserve in the energy storage device.

DE 10 2010 029 971 A1 describes a reduction in energy consuming units in a full-hybrid vehicle. This is intended so as to reach the next-closest charging station on a driving route purely electrically.

DE 10 2005 046 340 A1 describes the process for reducing onboard network consumption of a 12 V onboard network. To this end, a restart is enabled with a 12 V engine start system.

According to DE 10 2011 089 085 A1, the battery capacity of a motor vehicle is controlled, wherein the driving performance is prioritized over comfort systems when the vehicle is being driven with the assistance of the electric drive.

The charge state must always be maintained relatively high with a 48 V energy storage device in order to ensure availability of the systems. Particularly with mild-hybrid motor vehicles, this occurs at the expense of comfort systems such as, for example, a system of the "Coasting/Engine off" function, which effects a switch-off of the combustion engine upon a decoupling of both drive systems, or a system with an automatic "Start/Stop," in which the combustion engine can be switched on and/or off without the ignition. The availability of these $CO_2$-relevant systems is thus continuously limited even though under certain circumstances sufficient energy is available in the 48 V storage device.

An underlying object of the invention is the reduction in fuel consumption and thus in $CO_2$ emissions without a user having to dispense with driving performance or a control function while doing so.

The object is achieved by the process according to embodiments of the invention, the motor vehicle according to embodiments of the invention, and the computer program product according to embodiments of the invention.

The invention is based on the idea to use at least one information-containing data value on a route section of a planned driving route, for example electronic information by an Internet traffic service (i.e. online traffic information), electronic information on a traffic situation, wherein the data value, for example, is transferred via a vehicle-to-vehicle communication connection, or to use predictive route data from navigation data to predict the energy requirement of a first device of an onboard electrical network of the motor vehicle and, using the predicted energy requirement, to regulate an energy reserve of the energy storage device on a respective route section such that no unnecessary energy reserve on the route section is retained for a device of an onboard network of the motor vehicle if said device is not expected to be used on the route section.

The process according to the invention for the route-dependent control of an energy storage device of an at least partially electrically operated motor vehicle, for example of a traction battery, comprises the following steps, which are executed by a charge state control device of the energy storage device, for example by a battery management system:

The charge state control device receives the at least one information-containing data value, wherein the information relates to a driving situation to be expected on a route section of a driving route of the motor vehicle. At least one data value can, for example, be received by a receiving device of the motor vehicle from the Internet or from another vehicle and transferred to the charge state control device. The driving situation to be expected may comprise, for example, a stretch-of-road feature, for example a pattern of the route section such as, for example, a switchback. The driving situation to be expected may additionally or alternatively relate to a current traffic situation on the route section, a traffic flow speed adjustment, or traffic conditions. The driving route in this case may comprise, for example, a route entered into a navigation system of the motor vehicle by the user.

Using the electronic information received, the charge state control device predicts an energy requirement of a first device of an onboard network of the motor vehicle on the route section. Preferably, the first device of the onboard network is a device comprising a chassis device. A chassis device comprises a device related directly to the drive of the motor vehicle, for example an electric turbocharger and/or a roll stabilizer. Thus, there is a predicting of the particular energy requirement that is directly required for the drive of the motor vehicle. Therefore, a practical use of the device can be incorporated into energy management by the process according to the invention.

When a predetermined lower threshold value of the predicted energy requirement of the first device of the onboard network is not met, a control signal is generated that causes an energy quantity of an energy reserve of the energy storage device reserved for the first device of the onboard network to be allocated at least partially to a second device of the onboard network.

Due to the process according to the invention, energy management of the energy storage device is significantly improved and an energy reserve can be divided up precisely, specific to the users and depending on the situation. The process according to the invention is especially suitable for controlling an energy storage device in a partially electrically operated motor vehicle, especially in a so-called mild-hybrid vehicle. The process according to the invention contributes in this case to significantly reducing fuel consumption and the carbon dioxide emissions of the motor vehicle. At the same time, the user of the motor vehicle has to hardly do without driving performance or comfort functions, or not at all. The process according to the invention can consequently be used especially efficiently in connection with a low-voltage onboard network.

According to a preferred embodiment of the process according to the invention, a value of a freely available energy reserve of the energy storage device on the route section can be predicted as a function of the predicted energy requirement of the first device of the onboard network. Depending on this, there is an at least partial allocation of the predicted freely available energy reserve of the energy storage device to the second device of the onboard network. This enables especially precise energy management, which contributes to an additional reduction in fuel consumption and carbon dioxide emissions. Especially efficient energy management can be achieved according to a further development of this embodiment when the predicting of the value of the freely available energy reserve considers a process of the motor vehicle that increases the charge state, particularly energy recovery.

In addition or as an alternative, according to a further development of the process according to the invention, an evaluation of the first device of the onboard network can take place using a usage criterion, wherein the usage criterion describes a predetermined minimum probability of usage of the first device of the onboard network on the route section. In this manner, there is an assignment of relevance or priority of the first device of the onboard network. Depending on a result of the evaluation of the first device, the predicting of the value of the freely available energy reserve takes place, wherein the predicted energy requirement of the evaluated first device of the onboard network is then only considered when the evaluated first device of the onboard network fulfills the usage criterion.

In an especially preferred further embodiment of the process according to the invention, the charge state control device determines the freely available energy reserve G for the second device of the onboard network as a function of the predicted energy requirement E of the first device of the onboard network and as a function of a driving situation factor x by means of a function G=E*x. In this manner, the available energy reserve can be considered based on personal requirements of the user, predefined situations, and/or vehicle-typical properties. Thus, during driving, it can be ensured that those devices of the motor vehicle have sufficient energy allocated to them that is necessary and desired due to a driving situation on the route section. For example, an electric turbocharger as the chassis device can only have increased reserve voltage allocated to it when a corresponding route section actually requires increased driving performance.

The determining of the freely available energy reserve G can consider a dependency of the driving situation factor x on, for example, a driving style of a user and/or a drive mode of the motor vehicle and/or a stretch-of-road feature and/or a traffic flow speed adjustment and/or a traffic situation. Through this further embodiment, specific situation-dependent and user-specific factors can be incorporated into the charge state control.

In an advantageous embodiment of the process according to the invention, the predicting of the energy requirement of the first device of the onboard network can take place by means of a driving maneuver of the driving situation to be expected. This enables an extensively situation-dependent and user-specific assessment of the chassis device.

Advantageously, the second device of the onboard network comprises a comfort system device, preferably a comfort system device that is designed to execute a "Start/Stop" function and/or a function for switching on and/or switching off engine coast (a so-called "Coast/Engine on/off" function). This advantageous embodiment of the process according to the invention considers the provision of a high level of driving comfort, so that the user barely has to do without comfort and simultaneously a provision of driving functions that enable especially energy-saving driving depending on the driving situation.

The previously stated object is likewise achieved by a charge state control device according to the invention that is designed to implement an embodiment of the aforementioned process. In doing so, this results in the aforementioned advantages.

The previously stated object is likewise achieved by a motor vehicle, preferably by a passenger vehicle and/or a mild-hybrid passenger vehicle comprising a charge state control device according to the invention. In doing so, this results in the aforementioned advantages.

The previously stated object is likewise achieved by a computer program product for controlling an energy storage device of an at least partially electrically operated motor vehicle on a route section of the driving route. The computer program product comprises at least one storage medium, for example a microchip or a USB stick with a program code stored thereupon, wherein the program code is designed to implement a process according to embodiments of the methods described herein, upon execution by a charge state control device to initiate this for this purpose. The previously mentioned advantages also result in this case.

The invention is explained in more detail again using specific exemplary embodiments by means of the appended drawings. The examples shown represent preferred embodiments of the invention. Elements having the same function have the same reference characters in the figures. The following is shown:

FIG. 2a,

Figure 1:
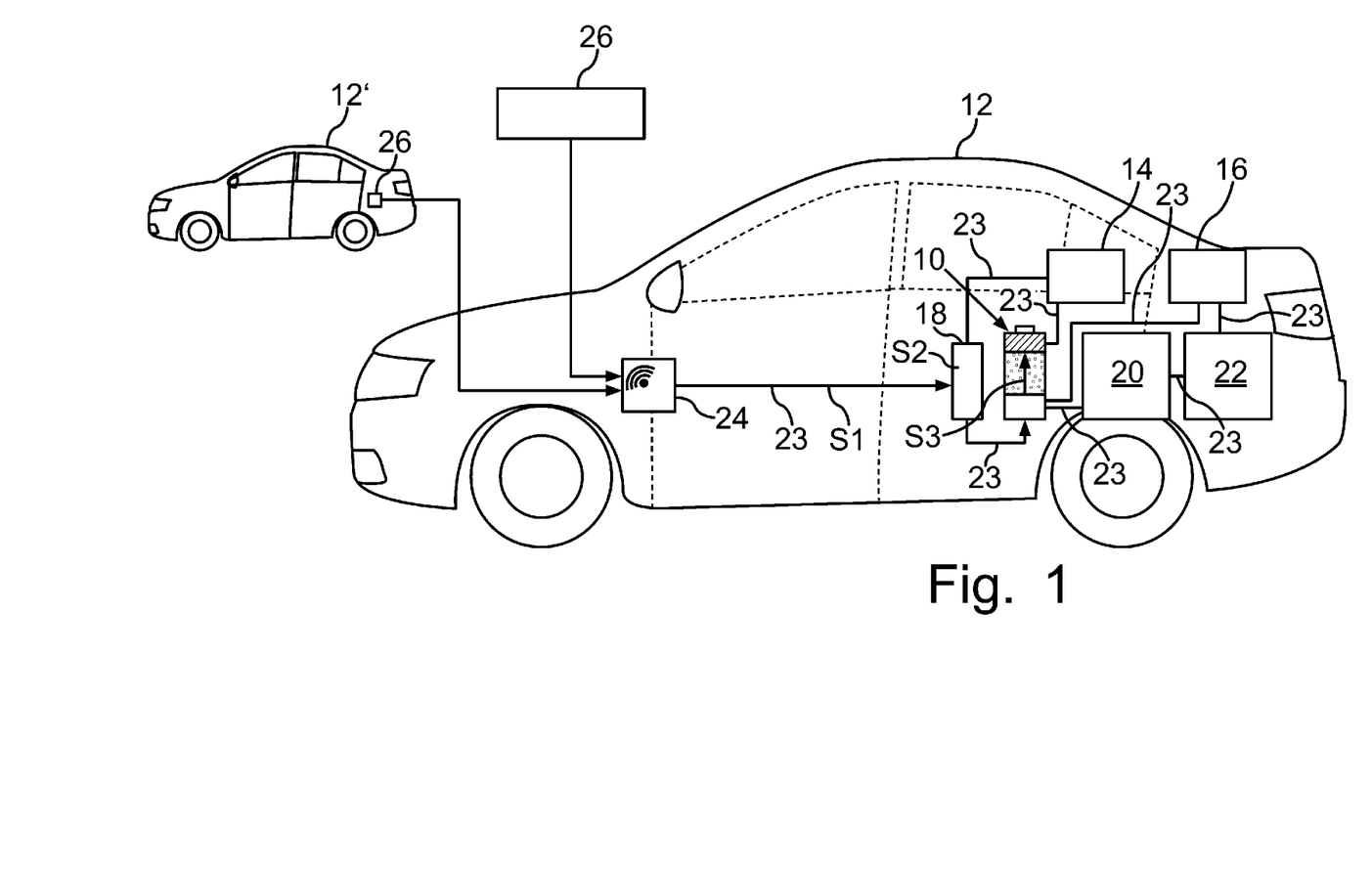
FIG. 1 shows a schematic view of a first embodiment of the process according to the invention for route-dependent control of an energy storage device.

FIG. 1 shows, in a schematic sketch, the principle of the process according to the invention for route-dependent control of an energy storage device 10 of an at least partially electrically operated motor vehicle 12, for example of a lithium battery or of a traction battery of a mild-hybrid motor vehicle, which preferably comprises a 48 V onboard network. The motor vehicle 12 in this case comprises a first device 14 of the onboard network, preferably a chassis device, i.e. a device that can be designed to directly influence the power train of the motor vehicle 12. Preferably, this is an electric turbocharger (eTurbo) and/or a roll stabilizer of the motor vehicle 12.

In the present example of FIG. 1, the motor vehicle 12 further comprises a second device 16 of the onboard network, preferably a comfort system device. For example, the comfort system device comprises a device that is designed to execute a "Start/Stop" function and/or an "Engine coast on/off" function. The motor vehicle 12 further comprises a charge state control device 18, for example a battery management system or an engine control unit with a microchip. The at least partially electrically operated motor vehicle 12 in FIG. 1 can preferably have an electric motor 20 and a combustion engine 22. The individual components of the onboard network of the exemplary motor vehicle 12 in FIG. 1 are connected to one another with either a wireless or wired communication connection 23.

The at least partially electrically operated motor vehicle 12 may comprise, for example, a receiving device 24, which is designed to receive at least one information-containing data value, for example from an external data server 26 or from a transmitter 26 of another motor vehicle 12', thus a receiving unit, for example, for vehicle-to-vehicle communication or an Internet-capable receiving unit. The data value, i.e. an electronic data set, describes the information. The receiving device 24 can then, for example, transfer the information-containing data value, in other words the data value providing the information, to the charge state control device 18, so that the charge state control device 18 receives the data value (process step S1). The information of the data value relates to a driving situation to be expected on a route section of a driving route of the motor vehicle 12. For example, if a user of the motor vehicle 12 has planned a trip from Ingolstadt to Munich, it can be stored and/or calculated, for example, in a navigation system of the motor vehicle 12. The information can then, for example, relate to and/or describe a traffic situation, a traffic flow speed adjustment, or a driving maneuver to be expected as a driving situation, for example driving in curves on the route section.

By means of the electronic information received, the charge state control device 18 predicts, in process step S2, the energy requirement of the first device 14 of the onboard network on the route section. In the present example, the information describes, for example, a report of a traffic jam or construction with a corresponding traffic flow speed adjustment of 40 km/h for example. Using this information, the charge state control device 18 can predict that the energy requirement of the first device 14, for example of the electric turbocharger, will be very low, because no high acceleration is possible, for example, on this route section. In this case, the charge state control 18 can determine, for example, a numerical value of 80 kWs and thus make a prediction.

In the present case, a certain threshold value for the exemplary electric turbocharger can be stored, for example, in the charge state control device 18. For example, by comparing the predicted energy requirement with the threshold value, the charge state device 18 can determine when the predefined threshold value has not been met by the predicted energy requirement and in response generate a control signal, wherein the control signal causes the energy storage device 18, for example with the assistance of a circuit board system known to one of ordinary skill in the art for controlling a charge state, to allocate an energy quantity of the energy reserve of the energy storage device 10 reserved for the first device 14 not to the first device 14 but rather to the second device 16 of the onboard network. The energy reserve of the energy storage device 10 is schematically shown in FIG. 1: The reserved energy quantity of the energy reserve, which can be initially reserved for the first device 14, is an area, for example, that is shown crosshatched in the energy storage device 10 in FIG. 1 and additionally comprises another area, which is indicated by dots in FIG. 1. Due to the allocation (S3), the area represented by dots in FIG. 1 of the energy storage device 10 can then be provided to the second device 16, wherein the crosshatched area can be reduced as a reserve for the first device 14 (shown in FIG. 1 by arrow S3).

In the at least partially electrically operated motor vehicle 12, it has proven to be advantageous when previously existing devices in the motor vehicle 12 can be used to provide the charge state control device with a function to increase the charge state, which effects, for example, a recovery of energy through recuperation (not shown in FIG. 1).

The charge state control device 18 can further be designed to evaluate the first device by means of a usage criterion. The usage criterion in this case can describe a predefined minimum probability of usage of the first device 14 on the route section. In the present example, the first device 14 can be evaluated, for example, with very low priority, because the exemplary electric turbocharger will be used with very low probability on the route section with the traffic jam. A result of the evaluation of the first device can then influence the determination of the freely available energy reserve. The predicting of the energy requirement of the first device 14 can likewise be influenced by a driving maneuver to be expected as the driving situation to be expected, for example stop-and-go driving, i.e. driving characterized by repeated acceleration and deceleration of the motor vehicle.

Figure 2A:
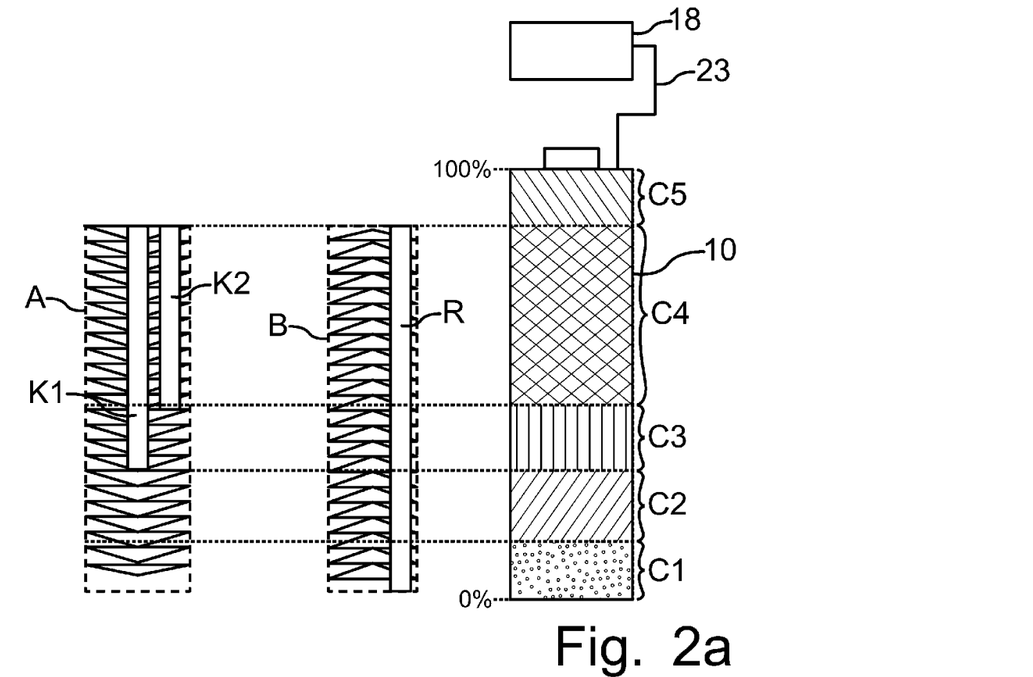
Figure 2B:
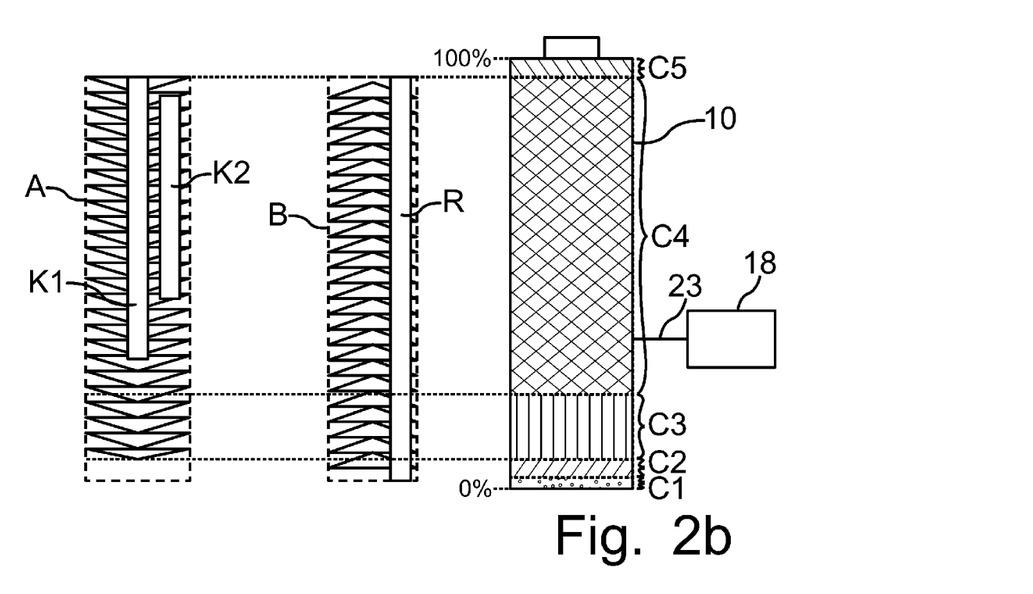
FIG. 2b show a schematic view of a further embodiment of the process according to the invention.

FIGS. 2a and 2b show an exemplary technical implementation of the process according to the invention. Scale A shows a scale for a process of the motor vehicle 12 to reduce the charge state, and scale B shows a scale for the process of the motor vehicle 12 to increase the charge state. The energy storage device 10 in this case is represented in FIGS. 2a and 2b as a schematic scale for the charging state of the energy storage device 10, wherein the dashed horizontal lines each represent a subsection of the charge state. The total height of the respective energy storage device 10 represents a 100% charge state (100% as compared to 0% as a state without any remaining energy quantity). The exemplary energy storage device 10 in FIGS. 2a and 2b may comprise, for example, a traction battery of a mild-hybrid motor vehicle as a motor vehicle 12. A first portion C1 of the total energy quantity of the exemplary energy storage device 10 in this case comprises, for example, a reserved portion of a chassis system. A further portion C2 of the total energy quantity of the energy storage device 10 in this case comprises an energy quantity portion for an electric turbocharger as a first device 14, which is held as a reserve in the energy storage device 10 for this first device 14. A reserve portion C5 of the total energy quantity of the energy storage device 10 in this case can represent a reserve of an energy recovery system from, for example, a 48 V chassis system.

FIG. 2a shows an exemplary situation of the charge state of the energy storage device 10, in which, after consideration of the exemplary reserves for one or more chassis devices, as a first device 14 of the onboard network, an energy reserve of an energy quantity remains which is represented by portions C3 and C4. Scale A shows that, as a result of this exemplary energy reserve C3, C4, a second device 16 of the onboard network, for example a comfort system device, which is designed to execute a "Start/Stop" function, has an energy quantity in the amount of portions C3 and C4 left over as an energy reserve. As an alternative, an energy quantity of the exemplary energy reserve C4 is available for a comfort system device as a second device 16 of the onboard network, which can, for example, implement an "Engine coast on/off" function. The arrows pointing downward in scale A indicate the charge-state-reducing effect of these functions. Under the assumption that the areas of energy quantity portions C1, C2, C3, C4, and C5 represent the corresponding relative portion of an energy quantity of a fully charged energy storage device 10, FIG. 2a shows that, for example, with a half-charged energy storage device 10, there is not a correspondingly sufficient energy reserve C3, C4 that can be provided for the exemplary comfort functions of the exemplary second device 16 of the onboard network. The height of bars K1, K2 in this case represents that energy quantity that is available from the exemplary automatic "Start/Stop" (K1) and/or the "Engine coast on/off" function (K2). In scale B, the upward-pointing arrows, for example, show a process that increases the charge state, for example energy recovery. The height of bar R represents the corresponding recovered energy quantity of the example.

FIG. 2b shows a charge state situation of the energy storage device 10 while using an embodiment of the process according to the invention. FIG. 2b makes it clear that the respective allocated energy quantity C1, C2, C5, of the respective first device 14 is significantly reduced, wherein the allocation takes place as a function of a respective predicted energy requirement of the respective first device 14. This reduced, allocated energy quantity depends on the respective predicted energy requirement of the respective first device 14. Thus, the exemplary charge state of FIG. 2b may be, for example, one of a known driving situation in which, the exemplary electric turbocharger and/or the exemplary roll stabilizer requires less actual energy quantity and/or was given less priority through an evaluation. Due to the reduced allocated portion C1, C2, C5, there remains a significantly higher energy reserve C3, C4 for exemplary comfort systems K1 and K2.

Figure 3A:
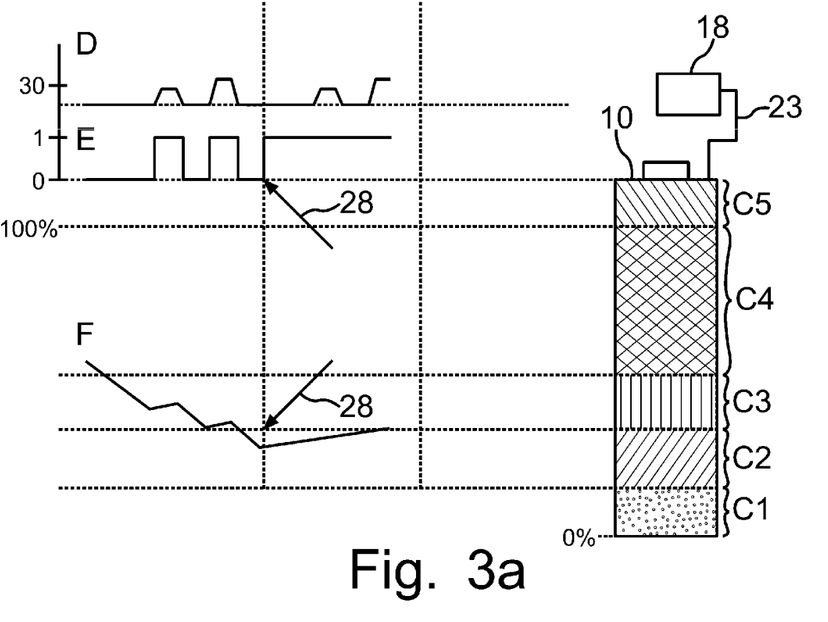
FIG. 3a shows a schematic view of a charge state control process according to the prior art.
Figure 3B:
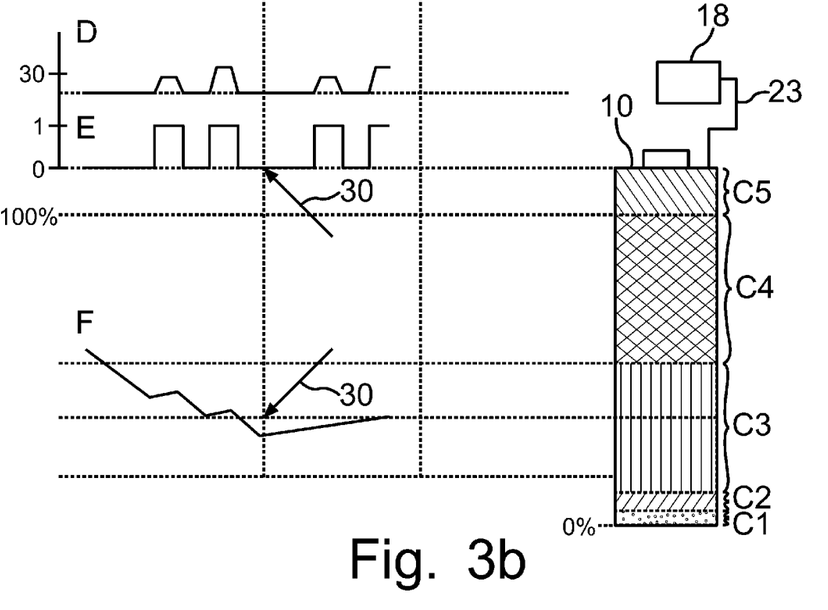
FIG. 3b shows a schematic view of a charge state control process of an energy storage device according to a further embodiment of the process according to the invention.

In a further exemplary embodiment of the process according to the invention, FIGS. 3a and 3b show the meaning of the process according to the invention for route-dependent control of the energy storage device 10. The energy storage device 10 schematically shown in FIG. 3a and in FIG. 3b in this case, shows, as previously explained regarding FIGS. 2a and 2b, the previously described energy quantity portions C1, C2, C3, C4, and C5 of a total energy quantity. An exemplary speed of the partially electrically operated motor vehicle 12 is applied in Diagram D, wherein the y-axis, for example, indicates a speed of the motor vehicle 12 in kilometers per hour and the x-axis represents the progression of time. Diagram E shows an operating state of a combustion engine 22, wherein the operating state 0 stands for a switched-off engine and the operating state 1 stands for a switched-on engine, and wherein the x-axis represents, on the same scale, the progression of time as in Diagram D. The progression of time in Diagram F is likewise represented similar to how it is in Diagrams D and E by a horizontal dashed line, while the curve drawn in Diagram F reflects a charge state of the energy storage device 10.

According to the exemplary embodiment, the motor vehicle 12, for example, is in a stop-and-go situation, this means in the exemplary traffic jam, in which the motor vehicle 12 switches back and forth between acceleration and deceleration. The exemplary acceleration and deceleration is reflected in Diagram D of FIGS. 3a and 3b by the brief increase and decrease of the curve. In the example in FIG. 3a, a situation is shown in which the motor vehicle 12 provides a charge state control according to the prior art. FIG. 3a shows that at a certain time, which is indicated in FIG. 3a by the arrow 28, an engine start must be carried out in order to ensure a predefined energy reserve of the energy storage device 10. Starting from this time, the combustion engine 22 is permanently switched on and accordingly generates carbon dioxide continuously starting from this point in time 28. Diagram F of FIG. 3a shows that the first device 12 of the onboard network, for example an electric turbocharger, is allocated an available energy reserve, although it would not be necessary in this situation. A lesser amount of freely available energy reserve C3, C4 is allocated by the charge state control device 18 for a second or additional device 14 of the motor vehicle 12. With the exemplary stop-and-go traffic in FIG. 3a, in which the charge state control takes place without the prediction according to the invention, resources are occupied that are lacking at another site, namely for a comfort function.

This is shown again using an exemplary calculation: In doing so, in the exemplary situation in FIG. 3a, it is assumed that a first device 14, which comprises, for example, an electric turbocharger with an 8 kW capacity, supports the combustion engine 22. The support from the first device 14 takes place, for example, with an acceleration lasting about 10 seconds. This results in a value of a required energy reserve of 10 * 8 kWs, i.e. 80 kWs or 0.022 kWh per acceleration. The usable energy reserve of the exemplary traction battery as an energy storage device 10 then comprises, for example, only about 0.2 kWh. This corresponds, for example, to a reserve of about 11% of the charge state for only one acceleration. When using the reserve for a Start/Stop function, an additional 1.5 minutes could be maintained in the exemplary start/stop operation with a 1 kW onboard network load of the combustion engine 22.

A corresponding charge state control, which is enabled with the assistance of the process according to the invention contrary to FIG. 3a, is shown in FIG. 3b. The arrow 30 shows the time at which a second device 16 of the onboard network, for example a comfort system device, which implements a Start/Stop function, prioritizes depending on the situation. As a result of the prioritization and the associated control of the charge state of the energy storage device 10, the freely available energy portion C3 increases in that energy reserves C1 and C2 are reduced. Contrary to the example in FIG. 3a, as a result, the exemplary engine according to Diagram E of FIG. 3b can only be turned on for a brief period and consequently does not have to be continuously in operation. A calculation of a freely available energy reserve can take place according to a preferred exemplary embodiment of the process according to the invention with the following functional approach:

In doing so, a limit G can be determined for the exemplary Start/Start operation, i.e. a required energy reserve G, in relation to a residual energy content of the energy storage device 10, from the product of the energy requirement E of the exemplary electric turbocharger for an acceleration, for example, and a driving situation factor x for the currently required energy reserve G. The driving situation factor x for the currently required energy reserve in this case can be dependent on and/or defined by the route information. The driving situation factor x for the currently required energy reserve can be determined as follows: In this case, for example a base value x=2 can be set that can be reduced or increased depending on the driving situation. The following change options for the driving situation factor x are given as an example:

x=x+2, if, for example, a driver is determined to be a sporty driver by an onboard system of the motor vehicle 12;

x=x−2, if, for example, a drive mode enables an especially efficient drive, for example a so-called efficiency drive mode;

x=x+2, if, for example, the information received describes an interstate/highway drive ahead;

x=x+1, if, for example, the route information describes a residential area with children at play ahead;

x=x−2, if, for example, the information received describes a traffic jam on the route section;

As an exemplary maximum (MAX) and/or minimum value (MIN) for the factor for a currently required energy reserve, the limits, for example, can be predetermined as follows: x=MAX(x;0) and/or x=MIN(x;5).

The previously stated exemplary embodiments of a process according to the invention for route-dependent control of an energy storage device 10 of an at least partially electrically operated motor vehicle 12 illustrate the idea of the invention that the charge state control device 18 should use predictive environmental data (such as, for example, online traffic information), data from vehicle-to-vehicle communication, or predictive route data from navigation data to reduce an energy requirement of a first device 14 of the onboard network of the motor vehicle 12 (or several first device 14 [sic] of the onboard network), for example of 48 V consuming units of a mild-hybrid motor vehicle. If this predicted energy reserve is small, a larger energy portion of the energy storage device 10 can be used for a second device 16 (or for several second devices 16), or preferably a comfort system device as a second device 16, which can implement, for example, a mild-hybrid feature. For example, if no high driving performance is expected in a traffic jam, then consequently no energy reserve is required, for example, for an electric turbocharger (eTurbo). As a result, energy can be used for a Start/Stop function for example, and an availability of the exemplary electric turbocharger is not noticeably limited. According to another example, if there is a 30 km/h zone without curves ahead, then no energy reserve is necessary for roll stabilization as a result. Consequently, energy can be used, for example, for a Start/Stop function, wherein the exemplary roll stabilization availability would not be noticeably limited.

The idea here is to plan an energy requirement for a directly occurring or pending driving maneuver based on a small energy storage device. Thus, the idea is not to switch off comfort consuming units, but rather to plan energy reserves in advance so that maximum feasibility of the comfort function and maximum comfort are assured.

This results in the advantage of less fuel consumption and less carbon dioxide consumption when operating the motor vehicle 12 without having to do without driving performance or comfort functions.

The invention claimed is:

1. A process for the route-dependent control of an energy storage device of an at least partially electrically operated motor vehicle, as implemented by a charge state control device of the energy storage device, the process comprising:
receiving at least one information-containing data value, wherein the information relates to a driving situation to be expected on a route section of a driving route of the motor vehicle;
predicting an energy requirement of a first device of an onboard network of the motor vehicle on the route section using the information received;
when a predetermined lower threshold value of the predicted energy requirement of the first device of the onboard network is not met, generating a control signal that causes an energy quantity of an energy reserve of the energy storage device reserved for the first device of the onboard network to be allocated at least partially to a second device of the onboard network; and
controlling the energy storage device of the motor vehicle based on the control signal to allocate the energy quantity of the energy reserve of the energy storage device reserved for the first device of the onboard network at least partially to the second device of the onboard network.

2. The process according to claim 1, further comprising:
predicting a value of a freely available energy reserve of the energy storage device on the route section as a function of the predicted energy requirement; and
allocating at least a portion of the predicted freely available energy reserve of the energy storage device to the second device of the onboard network.

3. The process according to claim 2, wherein predicting the value of the freely available energy reserve considers a process that increases the charge state.

4. The process according to claim 2, further comprising:
evaluating the first device of the onboard network of the motor vehicle using a usage criterion, which describes a predetermined minimum probability of usage of the first device of the onboard network on the route section; and
depending on a result of the evaluation of the first device, predicting of the value of the freely available energy reserve, wherein the predicted energy requirement of the evaluated first device of the onboard network is then only considered when the evaluated first device of the onboard network fulfills the usage criterion.

5. The process according to claim 2, further comprising:
determining the freely available energy reserve G for the second device of the onboard network as a function of the predicted energy requirement E of the first device of the onboard network and a driving situation factor x by means of a function $G=E*x$.

6. The process according to claim 5, wherein the determining of the freely available energy reserve G considers a dependency of the driving situation factor x on a driving style of a user of the motor vehicle and/or a drive mode and/or a stretch-of-road feature and/or a traffic flow speed adjustment and/or a traffic situation.

7. The process according to claim 1 wherein the predicting of the energy requirement of the first device of the onboard network takes place via a driving maneuver of the driving situation to be expected.

8. The process according to claim 1,
wherein the second device of the onboard network comprises a comfort system device that is designed to execute a "Start/Stop" function and/or a function for switching on and/or switching off an engine coast.

9. The process according to claim 1,
wherein the first device of the onboard network comprises a chassis device in the form of an electric turbocharger and/or a roll stabilizer.

10. A charge state control device of an energy storage device of an at least partially electrically operated motor vehicle, the charge state control device designed to implement a process for the route-dependent control of the energy storage device, the process comprising:
receiving at least one information-containing data value, wherein the information relates to a driving situation to be expected on a route section of a driving route of the motor vehicle;
predicting an energy requirement of a first device of an onboard network of the motor vehicle on the route section using the information received;
when a predetermined lower threshold value of the predicted energy requirement of the first device of the onboard network is not met, generating a control signal that causes an energy quantity of an energy reserve of the energy storage device reserved for the first device of the onboard network to be allocated at least partially to a second device of the onboard network; and controlling the energy storage device of the motor vehicle based on the control signal to allocate the energy quantity of the energy reserve of the energy storage device reserved for the first device of the onboard network at least partially to the second device of the onboard network.

11. The charge state control device of claim 10, wherein the charge state control device is a component of a mild-hybrid passenger vehicle.

12. A non-transitory storage medium with program code of a computer program stored thereupon, wherein the program code is designed to implement a process for the route-dependent control of an energy storage device of an at least partially electrically operated motor vehicle on a route section of a driving route, as implemented by a charge state control device of the energy storage device, the process comprising:

receiving at least one information-containing data value, wherein the information relates to a driving situation to be expected on a route section of a driving route of the motor vehicle;

predicting an energy requirement of a first device of an onboard network of the motor vehicle on the route section using the information received;

when a predetermined lower threshold value of the predicted energy requirement of the first device of the onboard network is not met, generating a control signal that causes an energy quantity of an energy reserve of the energy storage device reserved for the first device of the onboard network to be allocated at least partially to a second device of the onboard network; and controlling the energy storage device of the motor vehicle based on the control signal to allocate the energy quantity of the energy reserve of the energy storage device reserved for the first device of the onboard network at least partially to the second device of the onboard network.

* * * * *